United States Patent
Osterlanger et al.

(10) Patent No.: US 8,814,748 B2
(45) Date of Patent: Aug. 26, 2014

(54) PLANETARY ROLLER GEAR DRIVE

(71) Applicant: Schaeffler Technologies AG & Co. KG, Herzogenaurach (DE)

(72) Inventors: Jurgen Osterlanger, Emskirchen (DE); Marco Meisborn, Hochstadt a.d. Aisch (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/685,764

(22) Filed: Nov. 27, 2012

(65) Prior Publication Data
US 2013/0143712 A1    Jun. 6, 2013

(30) Foreign Application Priority Data
Dec. 1, 2011 (DE) .......................... 10 2011 087 560

(51) Int. Cl.
*F16H 1/30* (2006.01)

(52) U.S. Cl.
USPC .......................................................... 475/333

(58) Field of Classification Search
USPC .................. 475/331, 333, 344, 338; 74/89.23, 74/89.31, 89.37, 127, 10.85, 25, 424.75
See application file for complete search history.

(56) References Cited

U.S. PATENT DOCUMENTS

| | | | | |
|---|---|---|---|---|
| 3,861,221 A | * | 1/1975 | Stanley | 74/25 |
| 5,992,258 A | * | 11/1999 | Kawase | 74/424.92 |
| 6,931,955 B2 | * | 8/2005 | Yatsushiro et al. | 74/89.4 |
| 2005/0160856 A1 | * | 7/2005 | Sugitani | 74/424.92 |
| 2008/0222892 A1 | * | 9/2008 | Nakamura | 29/893.1 |
| 2010/0101347 A1 | * | 4/2010 | Uesugi et al. | 74/424.75 |

FOREIGN PATENT DOCUMENTS

DE            8513093            10/1986

* cited by examiner

*Primary Examiner* — Justin Holmes
(74) *Attorney, Agent, or Firm* — Volpe and Koenig, P.C.

(57) ABSTRACT

Planetary roller gear drive with a spindle nut (2) that is arranged on a threaded spindle (1) and is divided into nut parts (6, 7) that can be adjusted relative to each other in the axial direction, and with a plurality of planets (3) that are arranged distributed around a periphery and are in roller engagement with the spindle nut (2) and the threaded spindle (1). An adjustment part (20) set in the axial direction against the one nut part (6) that can be adjusted in the axial direction is provided and the one nut part (6) that can be adjusted in the axial direction is arranged between this adjustment part and the other nut part (7).

15 Claims, 3 Drawing Sheets

PLANETARY ROLLER GEAR DRIVE

INCORPORATION BY REFERENCE

The following documents are incorporated herein by reference as if fully set forth: German Patent Application No. 102011087560.3, filed Dec. 1, 2011.

BACKGROUND

The present invention relates to a planetary roller gear drive that converts a relative rotation between a spindle nut and a threaded spindle into a relative translational displacement between the spindle nut and threaded spindle.

From DE 8513093 U1, a planetary roller gear drive is known that is provided with a plurality of planets that are arranged distributed around the periphery and are in rolling engagement with the threaded spindle and the spindle nut, with the threaded spindle having a plurality of helical windings of at least one thread groove. These windings are wound about the spindle axis. The spindle nut is provided on its inner periphery with a nut-side profile, with the planet-side profile of the profiles in rolling engagement with the nut-side profile. The planet-side profile is formed by ring-shaped, closed grooves that are arranged perpendicular to the planet axis. The planets run on orbits that are arranged perpendicular to the spindle axis.

During the operation of such planetary roller gear drives, slippage between the threaded spindle and spindle nut can be observed if the planets circulate without sufficient axial loading. This means, for example, that for a revolution of the spindle nut, the axial advance of the threaded spindle is less than would be the case for a slip-free operation. In an extreme case, a relative rotation without axial advance can be observed.

To reduce the slippage, it is provided according to DE 8513093 U1 to divide the spindle nut into two nut parts that are arranged one behind the other in the axial direction, with an intermediate ring with a matching width being inserted between the two nut parts. The width of the intermediate ring is dimensioned so that the planets are in rolling engagement with the two nut parts and also in rolling engagement with the threaded spindle.

The width of the intermediate ring must be determined only by either calculating a width or determining the provided width with calibration rings with installed nut parts. The production of intermediate rings that are matched in width is complicated.

SUMMARY

The object of the present invention is to disclose a planetary roller gear drive that avoids this disadvantage.

This objective is met by the planetary roller gear drive according to the invention. This arrangement, wherein an adjustment part is provided that is set in the axial direction against the one nut part that can be adjusted in the axial direction and the one nut part that can be adjusted in the axial direction is arranged between this adjustment part and the other nut part, produces several advantages:

The adjustment part needs no special axial width; it is sufficient to set the adjustment part against the one adjustable nut part and to shift it in the direction of the other nut parts until a desired distance is set between the nut parts. For an adequately set adjustment part, the planets can be biased into rolling engagement with the spindle nut and the threaded spindle. Slippage of the planets is thus reduced to a minimum.

Another advantage is provided in that the planetary roller gear drive can be essentially preassembled: the nut parts can be preassembled on the threaded spindle with the planets arranged between the spindle nut and the threaded spindle. The adjustment part can now be easily mounted so that it is set against the one nut part until the desired distance is set between the nut parts.

The adjustment part can be fixed in a receptacle part of the spindle nut. If the desired setting of the adjustment part against the one nut part is achieved through the axial displacement in the direction toward the other nut part, a return movement of the one nut part in the opposite direction is blocked; in this sense, the adjustment part is fixed in the receptacle part, the adjustment part does not need to be blocked in the direction toward the other nut part, because the planets prevent further advance of the one nut part and thus of the adjustment part in the direction toward the other nut part.

However, it can be desirable to fix the adjustment part in the receptacle part, for example, to prevent the generation of noise. In this case, it is preferable if the receptacle part and the adjustment part have support profiles that engage with a positive fit one in the other for the axial positive-fit support of the adjustment part. These support profiles can be formed by projections and recesses that engage one in the other and are formed on the receptacle part and on the support part.

One planetary roller gear drive that is especially simple and can be manufactured economically according to the invention provides that one of the support profiles is formed by plastic shaping of material into the other support profile. There are several possibilities here:

The support part formed from steel can be provided with a support profile, for example, on its lateral surface and can be hardened in a heat treatment process. The receptacle part can be formed, for example, by a thin-walled steel sleeve in which the support part is arranged. The material of the sleeve can now be formed into the support profile of the support part, so that the support part is fixed in the receptacle part. The shaping consequently forms a support profile on the receptacle part. The support profile can be formed by parallel grooves arranged perpendicular to the spindle axis. In this case, a rolling tool with adapted grooves can be used, with this tool being moved from outside of the sleeve radially inwards against the sleeve, thus rolling material of the sleeve into the grooves of the support part.

Another improvement provides that the receptacle part is made from steel and is hardened in a heat treatment process, wherein the receptacle part is provided on its lateral surface with a hard support profile. In this case, the support part can be non-hardened and widened such that the support part is pressed against the support profile of the receptacle part, wherein material of the support part is formed into the support profile of the receptacle part.

Advantageously, the adjustment part is constructed as an adjustment ring that is arranged on the threaded spindle and on whose outer cylindrical lateral surface the support profile is constructed. The material of the receptacle part can be rolled in a rolling process into the support profile, wherein the adjustment ring can be provided on its cylindrical lateral surface with grooves. Material of the receptacle part is rolled into these grooves. The construction as a ring allows a simple rotation of a rolling tool around the ring.

The receptacle part can be formed by a sleeve, wherein sleeve material is formed into the support profile. In particular, in connection with the annular support part, a simple rotation between a rolling tool and the sleeve is possible, in order to achieve the desired rolling of material. A wall thickness of the sleeve can be tapered at one end, wherein this end forms a shaping section whose material can be shaped into the support profile of the support part.

The receptacle part can be provided with an axial stop on which the other nut part is supported in the axial direction, wherein the one nut part that can be adjusted in the axial direction relative to the receptacle part is arranged so that it can move in the axial direction in the receptacle part. In this way, a desired distance between the nut parts can be set, wherein the two nut parts are fixed in the axial direction between the axial stop on one side and the adjustment part on the other side. The two nut parts also do not move closer to each other, because the planets prevent such movement. The two annular nut parts can consequently be arranged favorably between the axial stop and the adjustment part.

The shape of the receptacle part can be different according to the application and selection of the production method. It is conceivable for the receptacle part to have a solid construction and to be hardened. In this case, the support part could be soft and its material could be shaped into a support profile of the hard receptacle part.

The invention allows a simple method for the production of a planetary roller gear drive according to the invention: installation of the nut parts on the threaded spindle with the planets, setting of the adjustment part against the one nut part in the direction toward the other nut part for a clearance-free rolling engagement of the planets with the spindle nut and with the threaded spindle, blocking of opposing adjustment movements of the adjustment part in the opposite direction. These simple measures can provide a nearly slip-free planetary roller gear drive.

If the receptacle part is constructed—as already mentioned—as a sleeve, the following method presents itself: installation of the annular nut parts and the planets on the threaded spindle, pushing of the sleeve until the one annular nut part contacts the axial stop of the sleeve, insertion of the adjustment part into the shaped section of the sleeve, setting of the adjustment part against the one nut part for a clearance-free rolling engagement of the planets with the spindle nut and with the threaded spindle, fixing of the adjustment part in the sleeve by shaping of material of the shaped section of the sleeve into the support profile of the adjustment part, wherein the shaped material forms the support profile of the sleeve. The planetary roller gear drive produced in this way according to the invention can be provided in a simple way.

BRIEF DESCRIPTION OF THE DRAWINGS

The invention will be explained in more detail below with reference to an embodiment shown in six figures. Shown are.

DETAILED DESCRIPTION OF THE PREFERRED EMBODIMENTS

Figure 1:
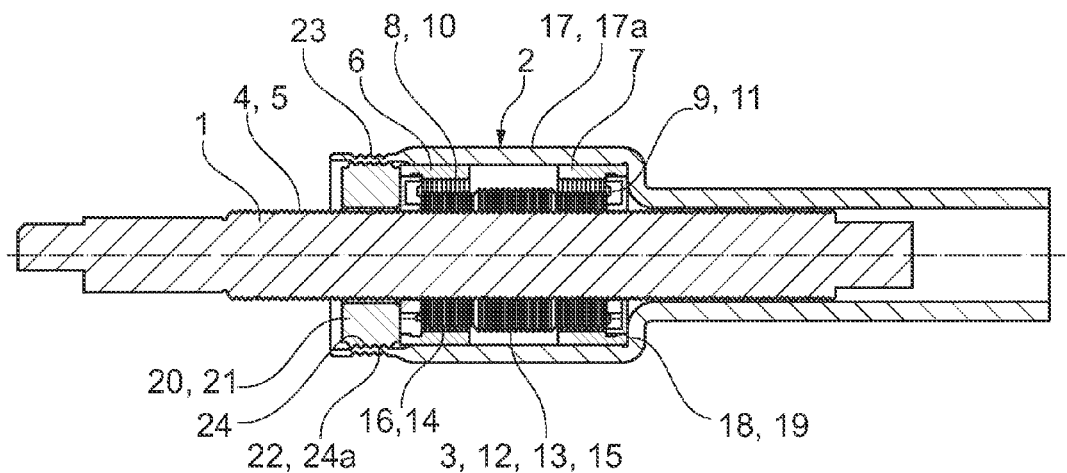
FIG. 1 is a longitudinal section view through a planetary roller gear drive according to the invention.

FIG. 1 shows a planetary roller gear drive with a spindle nut 2 arranged on a threaded spindle 1. Planets 3 are arranged distributed around the periphery between the spindle nut 2 and the threaded spindle 1 and are in rolling engagement with the spindle nut 2 and the threaded spindle 1. Under relative rotation between the threaded spindle 1 and the spindle nut 2, the planets 3 roll both on the inner periphery of the spindle nut 2 and also on the outer periphery of the threaded spindle 1 and rotate about their own planetary axis and also about the spindle axis. The planets 3 revolve along a planetary orbit placed perpendicular to the spindle axis.

The threaded spindle 1 is provided with a thread 4 wound in a helical shape about the spindle axis, such that a thread groove 5 is formed by a plurality of windings. Instead of a single thread groove 5, a multi-start thread with a plurality of thread grooves can be provided.

The spindle nut 2 has a multi-part construction. It has two coaxial annular nut parts 6, 7 that are arranged one behind the other in the axial direction. Both nut parts 6, 7 have a nut-side engagement profile 8, 9 on their inner periphery. This profile is formed from several parallel, endless grooves 10, 11 that are arranged perpendicular to the spindle axis.

The planets 3 each have a planet-side engagement profile 12 that comprises a middle groove profile 13 and an end-side groove profile 14 on each side, wherein the groove profiles 13, 14 are each formed from multiple parallel, endless grooves 15, 16 that are arranged perpendicular to the spindle axis. The middle groove profile 13 is in rolling engagement with the thread 4 of the threaded spindle 1. The two end-side groove profiles 14 are in rolling engagement with the two engagement profiles 8, 9 of the two nut parts 6, 7.

The spindle nut 2 also has a sleeve 17 in which the two nut parts 6, 7 are locked in rotation. The sleeve 17 has an axial stop 18 for the nut part 7, wherein the axial stop 18 is formed by a radial offset 19 of the sleeve 17. The sleeve 17 forms a receptacle part 17a for the two nut parts 6, 7.

The nut part 6 is arranged in a sliding seat so that it can move in the axial direction in the sleeve 17.

An adjustment part 20 inserted at the open end of the sleeve 17 is connected rigidly to the sleeve 17 and set against the nut part 6 in the axial direction. The adjustment part 20 is constructed in the embodiment as an adjustment ring 21 and arranged coaxially on the threaded spindle 1. The adjustment ring 21 has a cylindrical lateral surface that is provided with a support profile 22. The sleeve 17 is provided on its end with a shaped section 23 with reduced wall thickness. Material of the shaped section 23 is shaped into the support profile 22, wherein a support profile 24 is formed on the shaped section 23 by this shaping. The engagement of the support profiles 22, 24 guarantees a trouble-free, fixed seat of the adjustment ring 21 in the sleeve 17. The support profile formed on the adjustment ring 21 is presently formed by multiple parallel grooves 25. Corresponding grooves on the shaped section 23 are formed by the shaping of the material of the shaped section.

Figure 2:
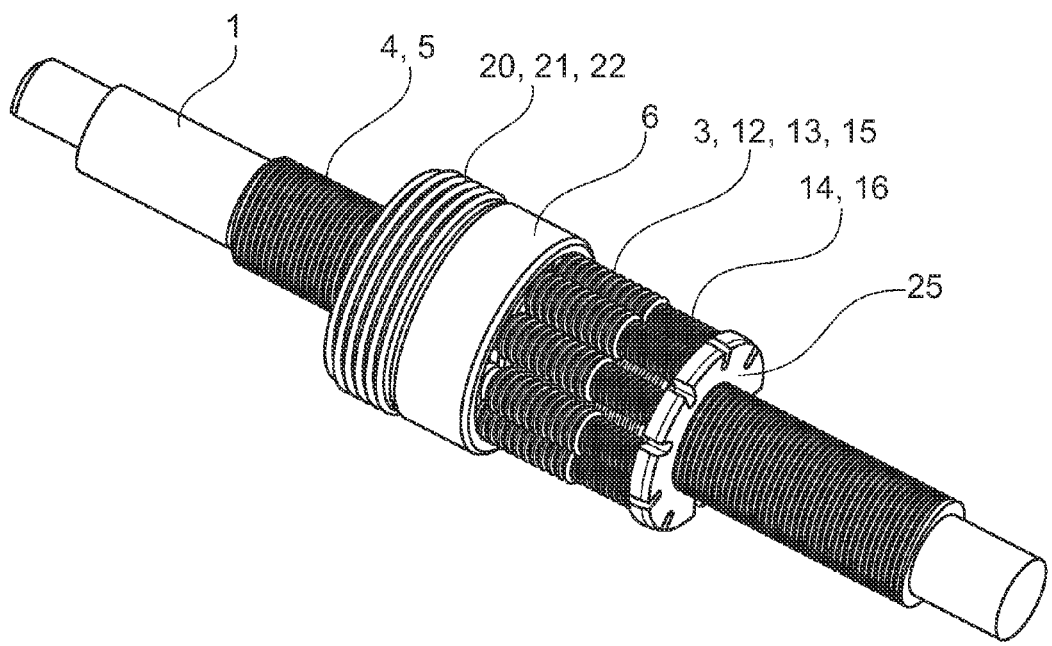
FIG. 2 is a perspective, partial view of the planetary roller gear drive from FIG. 1.

FIG. 2 shows, in a perspective view, the planetary roller gear drive from FIG. 1, but without the sleeve 17 and without the nut part 7. The planets 3 that are guided on the two axial ends in spacer rings 25 and are arranged distributed uniformly about the periphery can be seen clearly.

Figure 3:
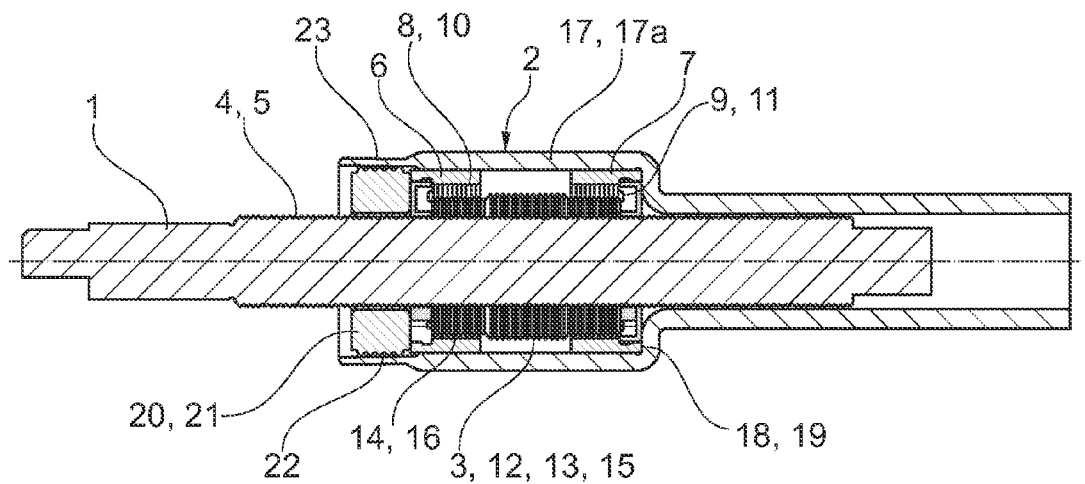
FIG. 3 is a view of the planetary roller gear drive as in FIG. 1, before a rolling process.

FIG. 3 shows the planetary roller gear drive in a view similar to FIG. 1, wherein the shaped section 23 of the sleeve 17 is not yet shaped into the support profile 22 of the sleeve 17. The cylindrical form of the shaped section can be seen clearly.

Figure 4:
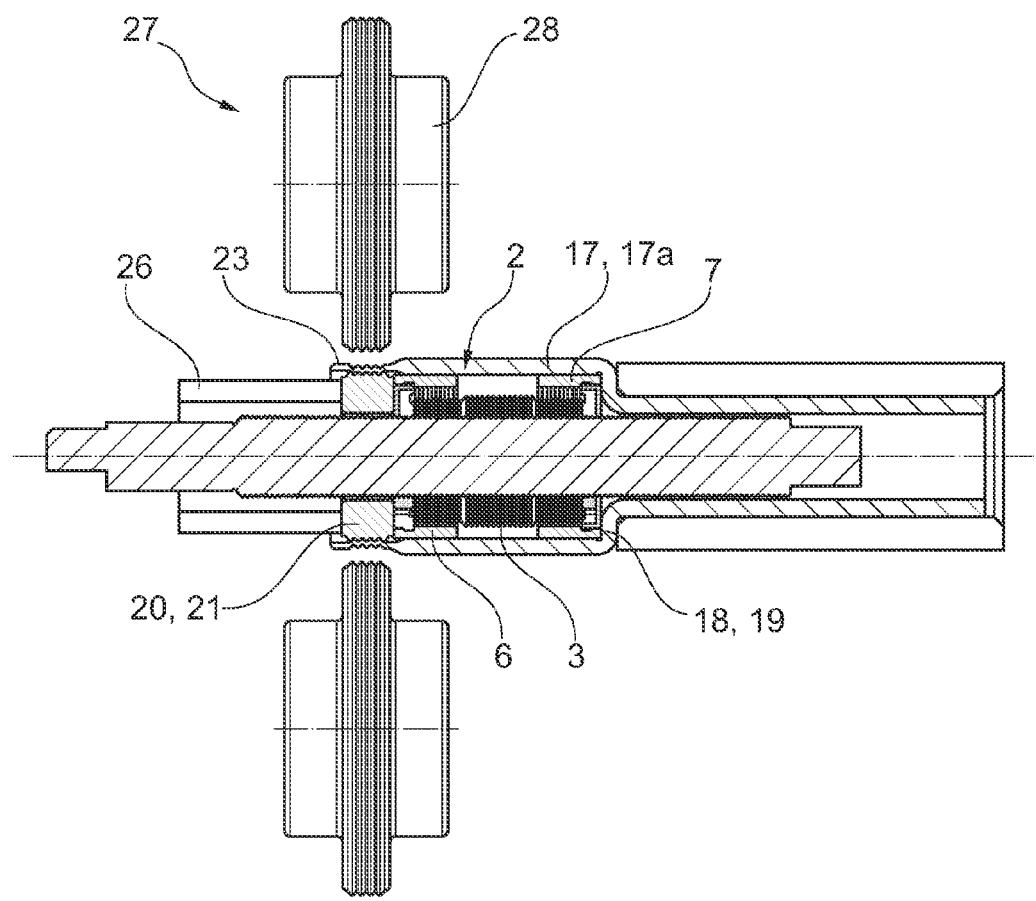
FIG. 4 is a view showing a manufacturing method according to the invention for the planetary roller gear drive from FIG. 1.

FIG. 4 shows the production step of shaping the material of the shaped section into the support profile 22 of the sleeve 17. The production of the planetary roller gear drive according to the invention will be described below.

In a first step, the two nut parts 6, 7 and the planets 3 are mounted on the threaded spindle 1. In a second step, the sleeve 17 is pushed until the nut part 7 contacts the axial stop 18. In a third step, the adjustment ring 21 is pushed in the direction toward the nut part 6 via a tool 26; the nut part 6 is pushed by the set adjustment ring 21 in the direction toward the nut part 7 until the planets 3 are in rolling engagement without play with the threaded spindle 1 and the spindle nut 2. In a fourth step, a rolling tool 27 is moved onto the shaping section 23. Rollers 28 of the rolling tool 27 are arranged on opposing sides of the shaped section 23 and provided with a groove profile 29 that is adapted to the grooves of the support profile 22 of the support ring 21. The rollers 28 are moved toward each other in the radial direction, wherein the lateral surface of the shaped section 23 is shaped by the pressure of the rollers 28 and rolled into the support profile 22 of the support ring 21. FIG. 4 shows the situation after completion of the rolling process for an opened rolling tool 27. After completion of the rolling process, the tool 26 can be moved back in the axial direction.

The invention is suitable, in particular, for planetary roller gear drives with wedge-shaped engagement profiles. The grooves thus have a toothed profile that is bounded by wedge-shaped flanks. Under axial loading, the planets move in the radial direction along these flanks until further movement is prevented, because either the threaded spindle or the spindle nut prevents further radial expansion or movement.

Figure 5:
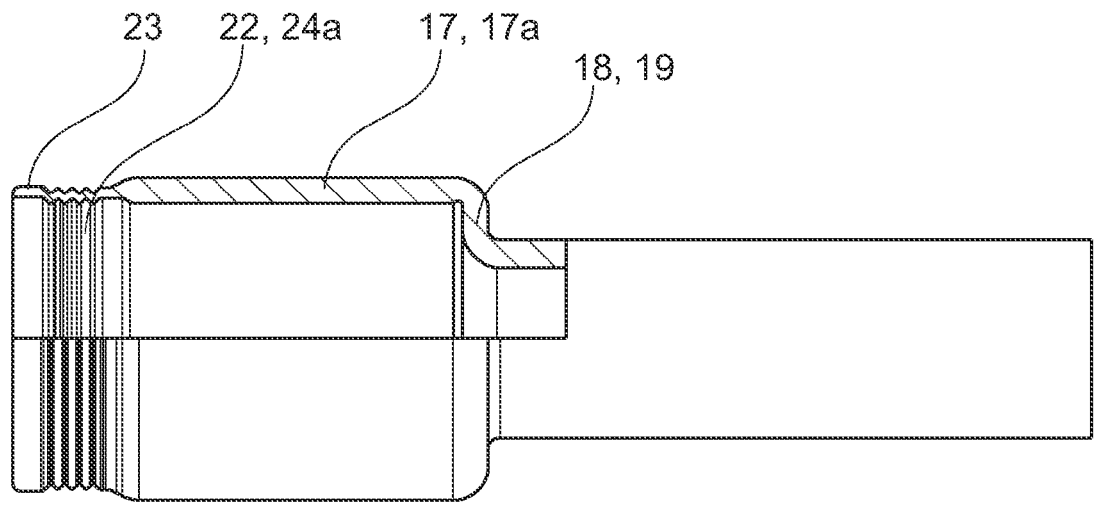
FIG. 5 is a view of an individual part of the planetary roller gear drive from FIG. 1.
Figure 6:
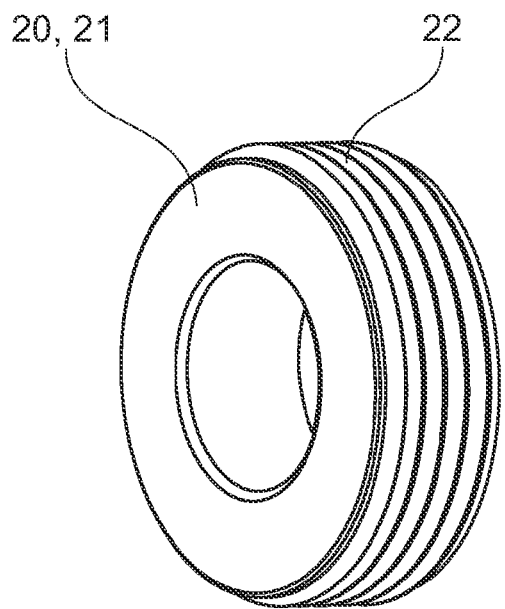
FIG. 6 is a view of another individual part.

FIGS. 5 and 6 show the sleeve 3 and the adjustment ring 21 as individual parts.

LIST OF REFERENCE NUMBERS

1 Threaded spindle
2 Spindle nut
3 Planet
4 Thread
5 Thread groove
6 Nut part
7 Nut part
8 Engagement profile
9 Engagement profile
10 Groove
11 Groove
12 Planet-side engagement profile
13 Middle groove profile
14 End-side groove profile
15 Endless groove
16 Endless groove
17 Sleeve
17a Receptacle part
18 Axial stop
19 Radial offset
20 Support part
21 Support ring
22 Support profile
23 Shaped section
24 Support profile
24a Groove
25 Spacer ring
26 Tool
27 Rolling tool
28 Roller

The invention claimed is:

1. A planetary roller gear drive comprising: a spindle nut arranged on a threaded spindle, the spindle nut is divided into first and second nut parts that can be adjusted relative to each other in an axial direction, a plurality of planets that are arranged distributed around a periphery of the threaded spindle and are in rolling engagement with the spindle nut and the threaded spindle, an adjustment part fixed in a receptacle part of the spindle nut is set against the first nut part and is adjustable in the axial direction and the first nut part is adjustable in the axial direction and is arranged between the adjustment part and the second nut part.

2. The planetary roller gear drive according to claim 1, wherein the receptacle part and the adjustment part have support profiles that engage in one another with a positive fit for support of the adjustment part with a positive fit in the axial direction.

3. The planetary roller gear drive according to claim 2, wherein one of the support profiles is formed by plastic shaping of material in the other support profile.

4. The planetary roller gear drive according to claim 2, wherein the adjustment part is constructed as an adjustment ring that is arranged on the threaded spindle and has an outer lateral surface on which the support profile is formed.

5. The planetary roller gear drive according to claim 2, wherein the receptacle part is formed by a sleeve, and sleeve material is formed into the support profile.

6. The planetary roller gear drive according to claim 1, wherein the spindle nut is provided with a receptacle part having an axial stop on which the second nut part is supported in the axial direction, and the first nut part is adjustable in the axial direction opposite the receptacle part so that it can move in the axial direction in the receptacle part.

7. The planetary roller gear drive according to claim 6, wherein the first and second annular nut parts are arranged between the axial stop and the adjustment part.

8. The planetary roller gear drive according to claim 6, wherein a wall thickness of the sleeve is tapered at one end, and said end forms a shaped section whose material is formed back into the support profile of the adjustment part.

9. A method for production of the planetary roller gear drive according to claim 1, comprising the following steps:
    installing the first and second nut parts on the threaded spindle with the planets,
    pushing of the sleeve until the first annular nut part contacts an axial stop of the sleeve,
    inserting the adjustment part of a shaped section of the sleeve with a reduced wall thickness,
    setting the adjustment part against the first nut part in a direction toward the second nut part for a clearance-free roller engagement of the planets with the spindle nut and also with the threaded spindle,
    fixing the adjustment part in the sleeve by shaping of material of the shaped section of the sleeve into a support profile of the adjustment part, wherein the shaped material forms the support profile of the sleeve, and
    blocking opposing adjustment movements of the adjustment part in an opposite direction.

10. A planetary roller gear drive comprising: a spindle nut arranged on a threaded spindle, the spindle nut is divided into first and second nut parts that can be adjusted relative to each other in an axial direction, a plurality of planets that are arranged distributed around a periphery of the threaded spindle and are in rolling engagement with the spindle nut and the threaded spindle, an adjustment part is set against the first nut part and is adjustable in the axial direction and the first nut part is adjustable in the axial direction and is arranged between the adjustment part and the second nut part.

11. The planetary roller gear drive according to claim 10, wherein the spindle nut is provided with a receptacle part having an axial stop on which the second nut part is supported in the axial direction, and the first nut part is adjustable in the axial direction opposite the receptacle part so that it can move in the axial direction in the receptacle part.

12. The planetary roller gear drive according to claim 10, wherein the first and second annular nut parts are arranged between the axial stop and the adjustment part.

13. The planetary roller gear drive according to claim 10, wherein a wall thickness of the sleeve is tapered at one end, and said end forms a shaped section whose material is formed back into the support profile of the adjustment part.

14. A method for production of the planetary roller gear drive according to claim 10, comprising the following steps:
  installing the first and second nut parts on the threaded spindle with the planets,
  setting the adjustment part against the first nut part in a direction toward the second nut part for a clearance-free roller engagement of the planets with the spindle nut and also with the threaded spindle, and
  blocking opposing adjustment movements of the adjustment part in an opposite direction.

15. The method for production of the planetary roller gear drive according to claim 14, comprising the following steps:
  installing the first and second nut parts, which are annular, and the planets on the threaded spindle,
  pushing of the sleeve until the first annular nut part contacts the axial stop of the sleeve, inserting the adjustment part in the shaped section of the sleeve,
  setting of the adjustment part against the first nut part for a clearance-free roller engagement of the planets with the spindle nut and also with the threaded spindle, and
  fixing the adjustment part in the sleeve by shaping of material of the shaped section of the sleeve into the support profile of the adjustment part, wherein the shaped material forms the support profile of the sleeve.

* * * * *